(12) United States Patent
Whitney, Jr.

(10) Patent No.: US 10,557,585 B2
(45) Date of Patent: Feb. 11, 2020

(54) WATER HAMMER ARRESTOR

(71) Applicant: Accor Technology, Inc., Kirkland, WA (US)

(72) Inventor: Charlie E. Whitney, Jr., East Wenatchee, WA (US)

(73) Assignee: Accor Technology, Inc., Kirkland, WA (US)

( * ) Notice: Subject to any disclaimer, the term of this patent is extended or adjusted under 35 U.S.C. 154(b) by 159 days.

(21) Appl. No.: 15/479,131

(22) Filed: Apr. 4, 2017

(65) Prior Publication Data
US 2018/0283591 A1 Oct. 4, 2018

(51) Int. Cl.
*F16L 55/04* (2006.01)
*F16L 55/053* (2006.01)

(52) U.S. Cl.
CPC ................................. *F16L 55/053* (2013.01)

(58) Field of Classification Search
CPC .............................. F16L 55/053; F16L 37/091
USPC ...................................................... 138/30, 31
See application file for complete search history.

(56) References Cited

U.S. PATENT DOCUMENTS

| | | | |
|---|---|---|---|
| 2,273,766 A | | 2/1942 | Tower, Jr. |
| 2,440,065 A | * | 4/1948 | Ashton ...................... F15B 1/24 138/31 |
| 2,545,867 A | | 3/1951 | Baker |
| 2,729,244 A | * | 1/1956 | Alaska ...................... F15B 1/24 138/31 |
| 2,734,531 A | * | 2/1956 | Bizak ........................ F15B 1/24 138/31 |
| 3,557,827 A | | 1/1971 | Marsh |
| 3,613,734 A | | 10/1971 | Elmer |
| 3,633,627 A | | 1/1972 | Perrott et al. |
| 3,741,692 A | * | 6/1973 | Rupp ..................... F16L 55/052 138/31 |
| 4,041,990 A | * | 8/1977 | Tang ..................... B60T 13/148 138/31 |
| 4,445,629 A | * | 5/1984 | Doerfler .................... B65B 3/32 138/30 |
| 4,693,276 A | | 9/1987 | Fulmer |
| 4,738,339 A | | 4/1988 | Taylor |
| 4,819,698 A | | 4/1989 | Ismert |

(Continued)

OTHER PUBLICATIONS

International Search Report and Written Opinion, PCT/US2009/42118, dated Dec. 22, 2010.

*Primary Examiner* — James F Hook
(74) *Attorney, Agent, or Firm* — Davis Wright Tremaine LLP; George C. Rondeau, Jr.; Heather M. Colburn

(57) ABSTRACT

A device for arresting a shock wave in a fluid in a pipe assembly. The device includes a base, body, and piston. The base has a connector portion with a first opening into an interior. The connector portion is configured to be coupled to the pipe assembly and allow the fluid to flow into the interior through the first opening. The body has an open end opposite a closed end and a channel that extends from the open end into the closed end. The open end is positioned inside a second opening into the interior of the base. Together the base and body form a housing in which the piston is positioned. The piston is slidable within the housing from a resting position to a compressing position when the shock wave travels through the pipe assembly. The piston compresses a gas inside the housing when in the compressing position.

15 Claims, 18 Drawing Sheets

(56) References Cited

U.S. PATENT DOCUMENTS

| | | | |
|---|---|---|---|
| 4,878,519 A * | 11/1989 | Berding | F15B 1/24 138/31 |
| 5,385,172 A | 1/1995 | Perrott et al. | |
| 5,655,569 A | 8/1997 | Tackett | |
| 5,721,664 A | 2/1998 | Uken et al. | |
| 5,744,047 A | 4/1998 | Gsell et al. | |
| 5,857,753 A | 1/1999 | Gowda | |
| 6,065,814 A * | 5/2000 | Nishii | B60T 8/4068 138/31 |
| 6,095,195 A | 8/2000 | Park et al. | |
| 6,154,961 A | 12/2000 | Park et al. | |
| 6,263,912 B1 | 7/2001 | Brown et al. | |
| 6,484,756 B1 * | 11/2002 | Weber | F15B 1/103 138/30 |
| 6,539,976 B1 | 4/2003 | Whiteside | |
| 6,732,758 B2 | 5/2004 | Kopp | |
| 6,920,844 B1 | 7/2005 | Ismert | |
| 7,373,953 B2 | 5/2008 | Minnick | |
| 7,520,292 B2 * | 4/2009 | Weltman | E03C 1/296 137/118.05 |
| 7,699,076 B2 | 4/2010 | Minnick | |
| 8,267,123 B2 * | 9/2012 | LeBlanc | F15B 1/24 138/30 |
| 8,555,923 B1 | 10/2013 | Minnick | |
| 8,939,177 B2 | 1/2015 | Condon et al. | |
| 9,080,709 B2 | 7/2015 | Mccoy et al. | |
| 9,273,701 B2 | 3/2016 | Condon et al. | |
| 9,273,813 B2 | 3/2016 | Condon et al. | |
| 9,284,965 B2 | 3/2016 | Condon et al. | |
| 2002/0139426 A1 * | 10/2002 | Kippe | F16L 55/053 138/30 |
| 2004/0200797 A1 | 10/2004 | Hicks et al. | |
| 2005/0034771 A1 | 2/2005 | Minnick | |
| 2005/0034953 A1 | 2/2005 | Came | |
| 2010/0037977 A1 * | 2/2010 | Rahimzadeh | F16L 55/115 138/96 R |
| 2015/0323115 A1 | 11/2015 | Mccoy et al. | |

* cited by examiner

US 10,557,585 B2

WATER HAMMER ARRESTOR

BACKGROUND OF THE INVENTION

Field of the Invention

The present invention is directed generally to devices configured to arrest water hammer and shock waves in other fluids in a pipe system.

Description of the Related Art

When an outlet of a pipe is suddenly closed, momentum in a mass of water before the outlet causes pressure, which results a shock wave. In domestic plumbing, this shock wave, which is referred to as a water hammer, causes a banging or hammering noise. If the pressure in the pipe is great enough, the pipe may vibrate and/or break. Therefore, a need exists for devices configured to reduce or eliminate water hammer. The present application provides these and other advantages as will be apparent from the following detailed description and accompanying figures.

BRIEF DESCRIPTION OF THE SEVERAL VIEWS OF THE DRAWINGS

Like reference numerals have been used in the figures to identify like structures.

DETAILED DESCRIPTION OF THE INVENTION

Figure 1:
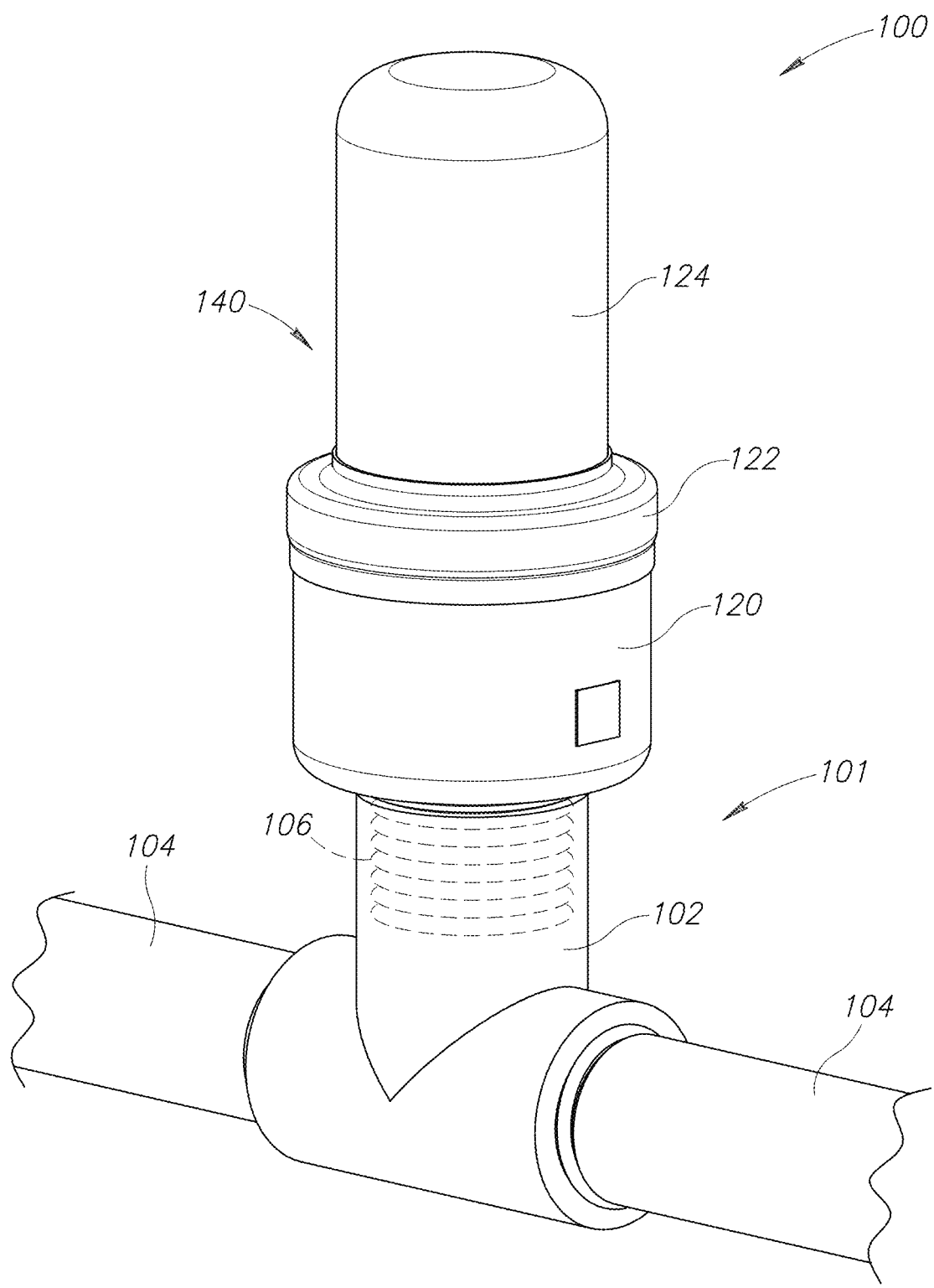
FIG. 1 is a perspective view of a water hammer arrestor installed in a pipe system.

FIG. 1 illustrates a water hammer arrestor 100 configured to be threaded into a pipe assembly 101. In the embodiment illustrated, the pipe assembly 101 includes a standard pipe fitting 102 connected to one or more pipes 104. The fitting 102 includes inside threads 106. The pipe(s) 104 may carry water or another type of fluid therein. Thus, a water hammer (or similar shock wave) may travel in the pipe assembly 101 passed the arrestor 100. The arrestor 100 is configured to reduce and/or eliminate the water hammer in the pipe assembly 101 when the water hammer reaches the arrestor 100.

Figure 2:
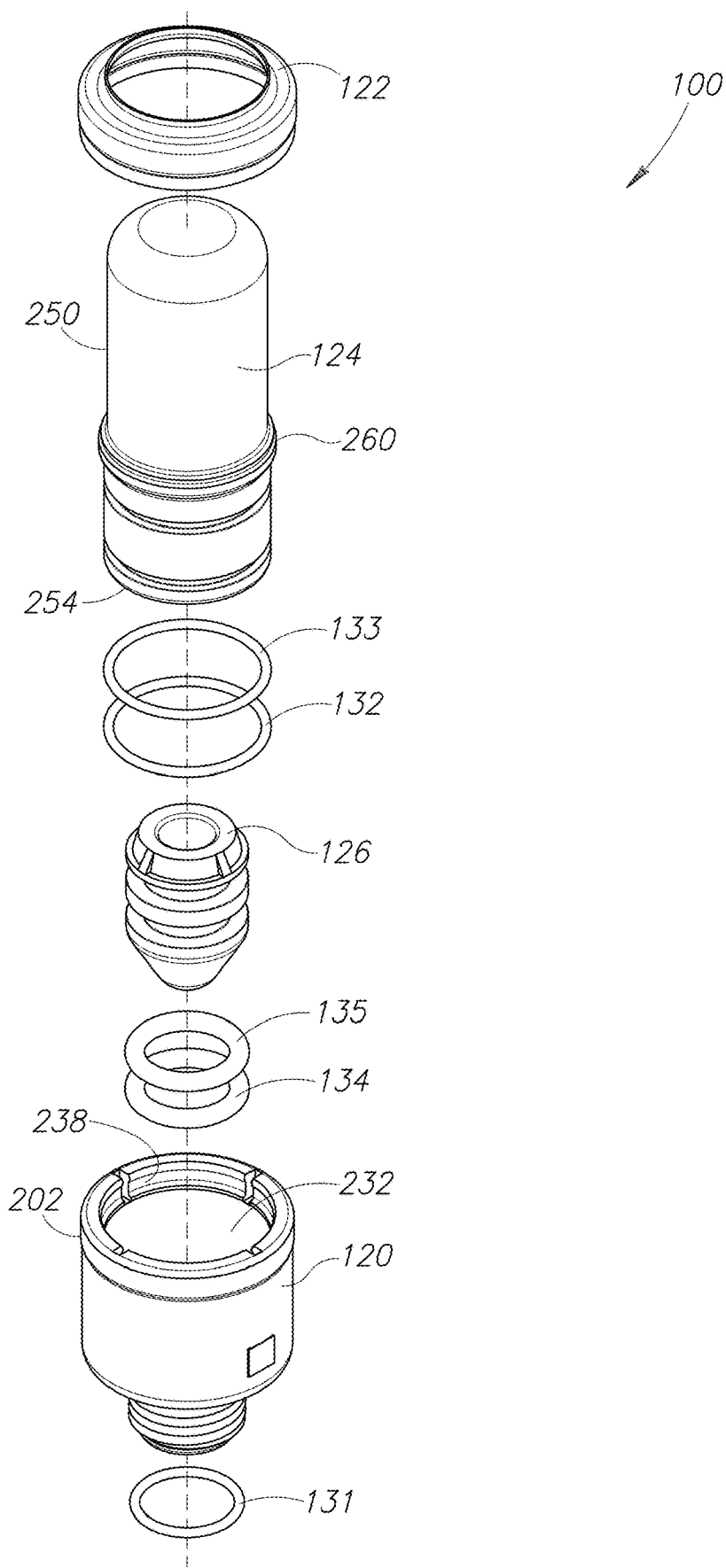
FIG. 2 is an exploded perspective view of the arrestor of FIG. 1.

Referring to FIG. 2, the arrestor 100 includes a base 120, a locking ferrule 122, a body 124, a plunger or piston 126, and a plurality of seals 131-135. Referring to FIG. 1, together, the base 120 and the body 124 form a housing 140 that is locked together by the ferrule 122. Thus, the housing 140 may be constructed without the use of welding or adhesives. In the embodiment illustrated, the housing 140 has a generally cylindrical outer shape with a circular lateral cross-sectional shape. The base 120, the body 124, and the piston 126 may each be constructed (e.g., molded, cast, forged, machined, and the like) from any suitable material, including plastic (e.g., chlorinated polyvinyl chloride ("CPVC")) and/or metal. The ferrule 122 may be constructed from metal (e.g., stainless steel, brass, bronze, aluminum, and the like) or other suitable material. Each of the seals 131-135 may be implemented as an O-ring.

Figure 3A:
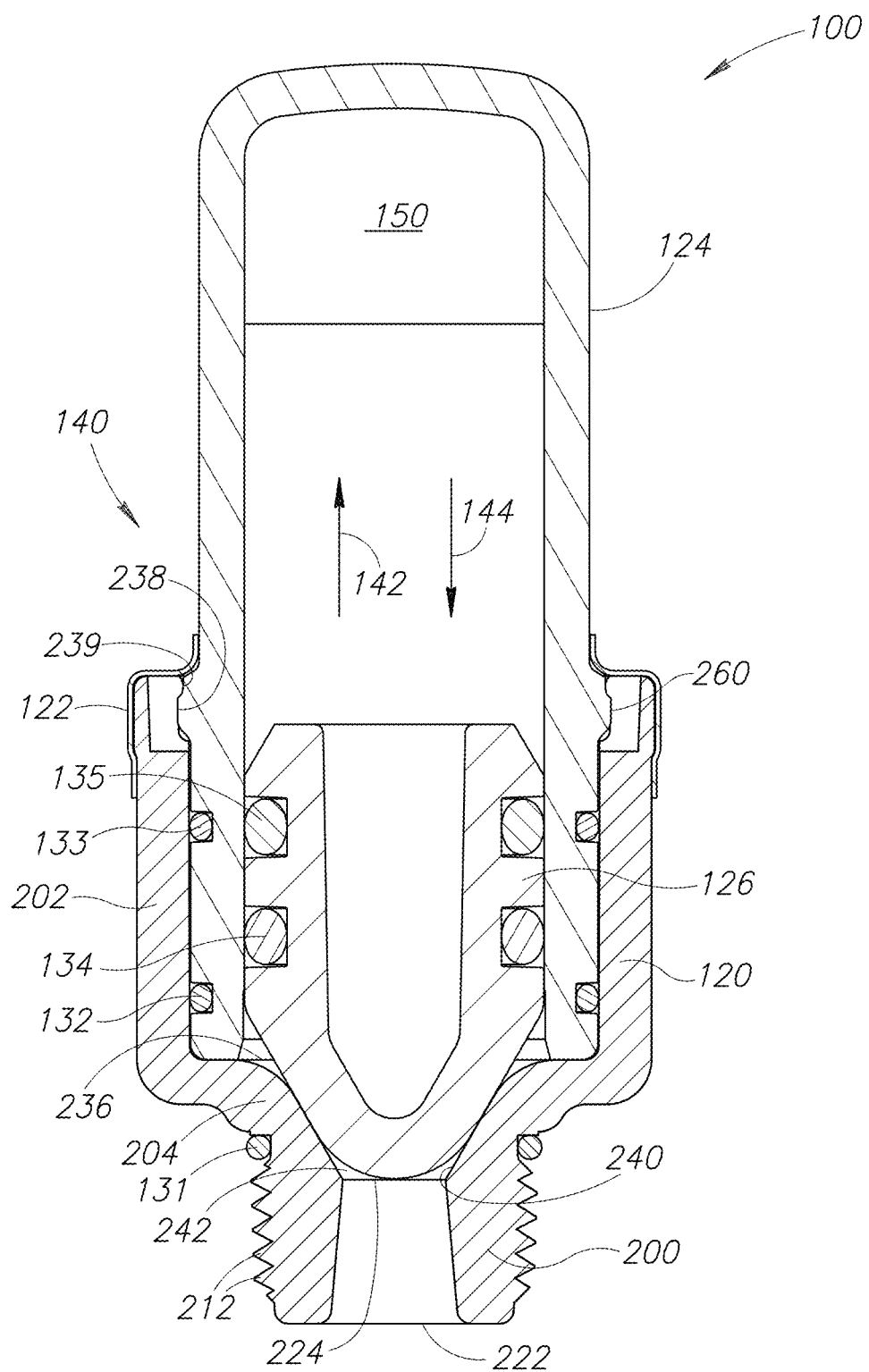
FIG. 3A is a cross-sectional side view of the arrestor of FIG. 1 illustrated with its piston in a resting position.
Figure 3B:
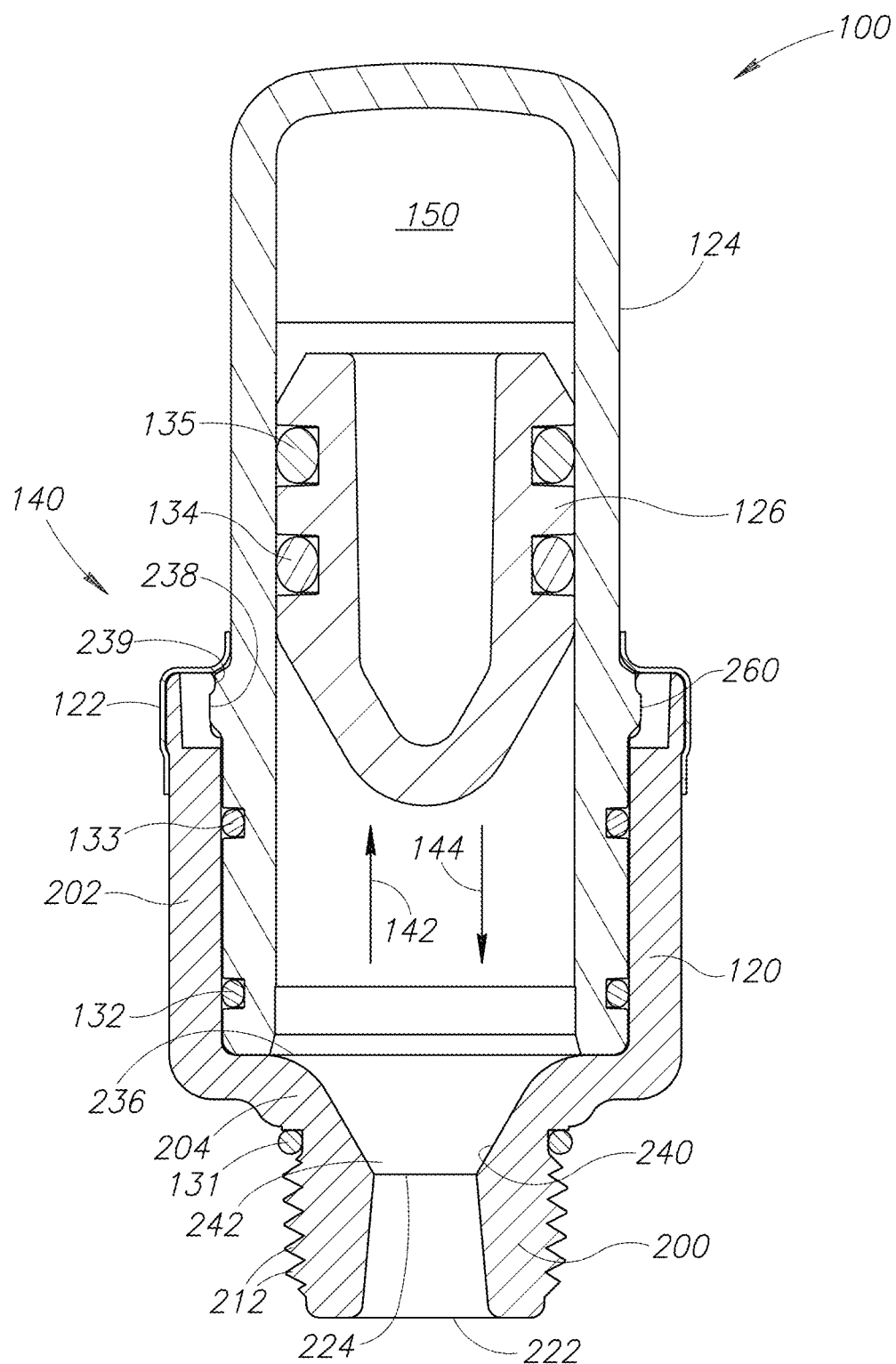
FIG. 3B is a cross-sectional side view of the arrestor of FIG. 1 illustrated with the piston moved along a compression direction to absorb at least a portion of the force of a water hammer traveling in the pipe system.
Figure 3C:
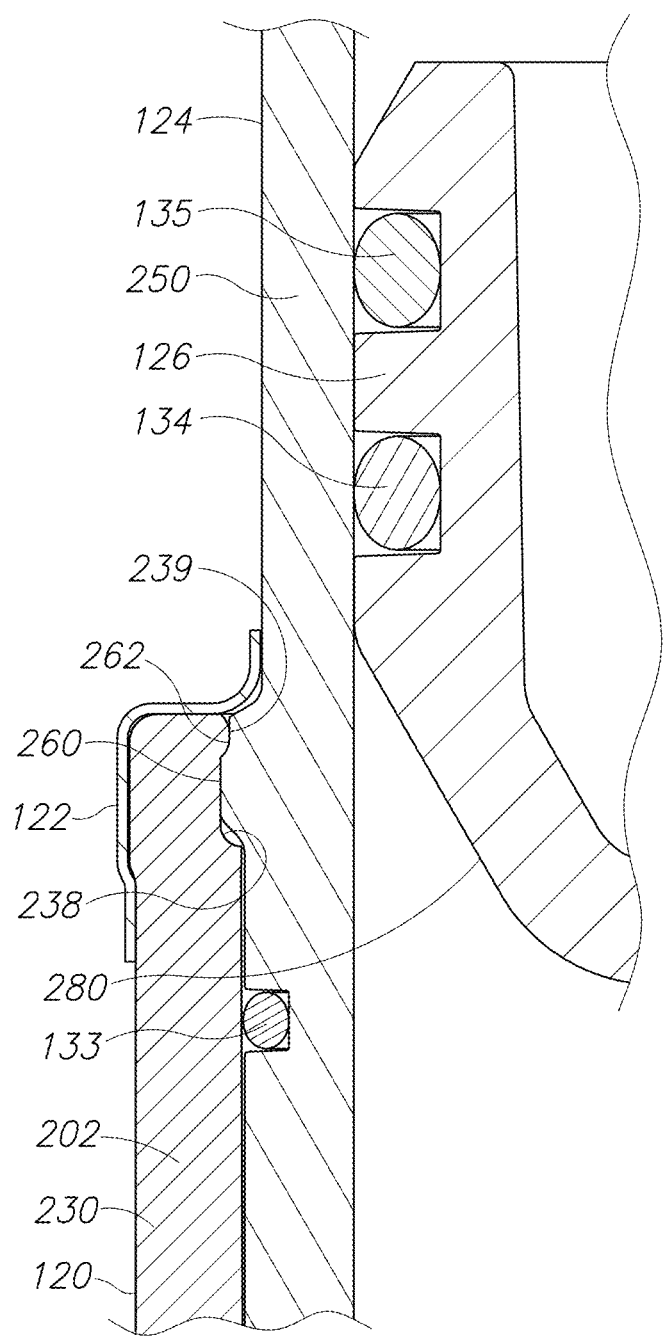
FIG. 3C is a cross-sectional side view of the arrestor of FIG. 3B rotated 45 degrees from the cross-sectional side view of FIG. 3B.

Referring to FIG. 3A, the piston 126 is positioned inside the housing 140 and configured to move linearly relative to the housing 140 in both a compression direction (identified by an arrow 142) and a decompression direction (identified by an arrow 144). A gas chamber 150 is defined within the body 124 above the piston 126. The gas chamber 150 is configured to hold a gas (e.g., nitrogen). As shown in FIG. 3B, the gas is compressed when the piston 126 moves in the compression direction (identified by the arrow 142) toward a compressing position. Conversely, referring to FIG. 3A, the gas decompresses when the piston 126 moves in the decompression direction (identified by the arrow 144) toward a resting position. As illustrated in FIG. 3A, the piston 126 rests on the base 120 (in the resting position) until a pressure wave in the pipe assembly 101 (see FIG. 1) causes the piston 126 to move toward the compression direction (identified by the arrow 142) illustrated in FIG. 3B. This causes the gas to absorb at least some of the energy of the pressure wave thereby reducing and/or eliminate the water hammer. When the pressure wave has dissipated, the piston 126 moves in the decompression direction (identified by the arrow 144) and returns to its resting position on the base 120 illustrated in FIG. 3A.

Figure 4:
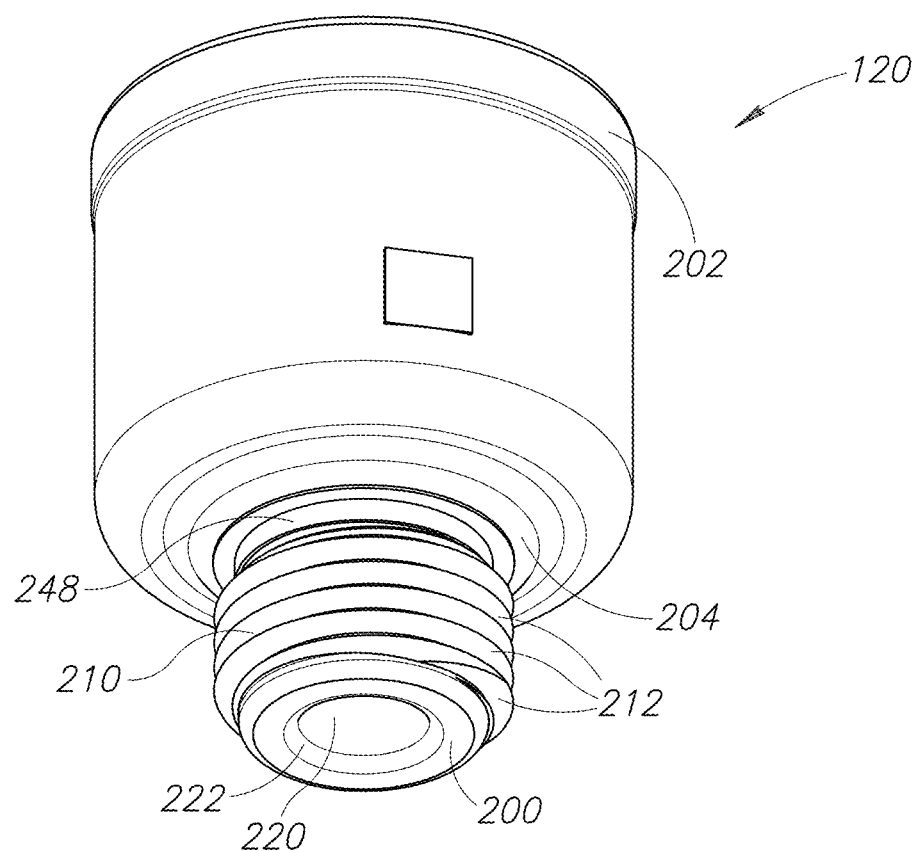
FIG. 4 is a bottom perspective view of a base of the arrestor of FIG. 1.

Referring to FIG. 4, the base 120 has a lower portion 200 opposite an upper portion 202. The base 120 also includes an intermediate portion 204 positioned between the lower and upper portions 200 and 202. The lower portion 200 has a connector portion 210 configured to be coupled to the pipe fitting 102 (see FIG. 1). In the embodiment illustrated, the connector portion 210 includes outside threads 212 configured to be threaded into the inside threads 106 (see FIG. 1) of the pipe fitting 102 (see FIG. 1) to couple the base 120 to the pipe fitting 102 and form a connection therewith. The lower portion 200 has a through-channel 220 that extends between lower and upper openings 222 and 224 (see FIGS. 3A, 3B, and 5).

Figure 5:
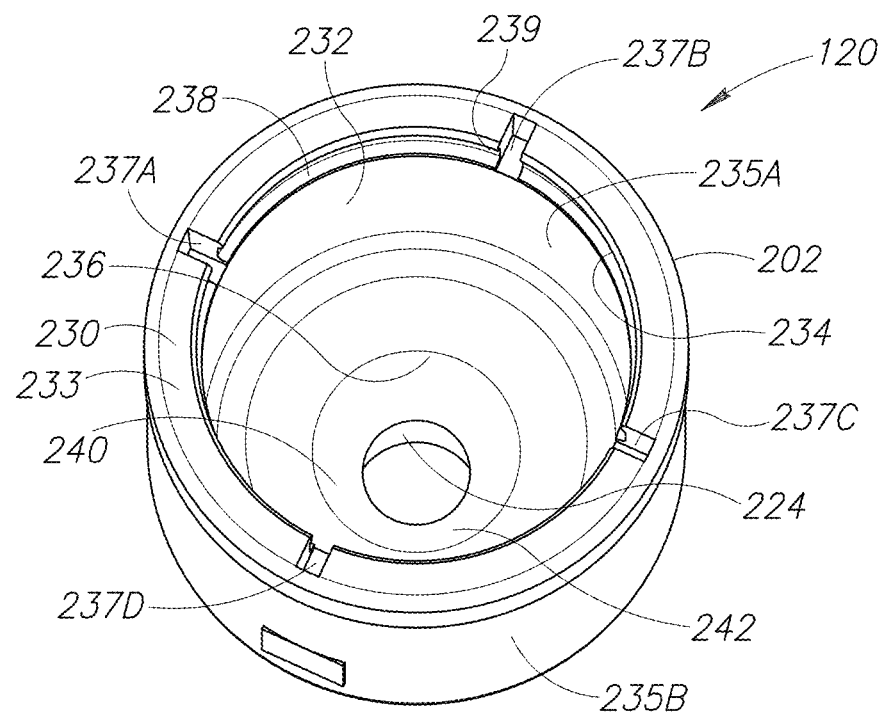
FIG. 5 is a top perspective view of the base of the arrestor of FIG. 1.

Referring to FIG. 5, the upper portion 202 has a sidewall 230 that defines an open-ended chamber 232 with upper and lower openings 234 and 236. The sidewall 230 has an upper surface 233 that surrounds the upper opening 234.

The upper opening 234 is configured to receive the body 124 (see FIGS. 1-3C, 6, and 10-14B) into the chamber 232. An inwardly facing surface 235A of the sidewall 230 includes an annular channel or groove 238 formed along the upper opening 234 of the chamber 232. Above the groove 238, the sidewall 230 may include an inwardly extending projection 239. Optionally, the upper portion 202 may include downwardly extending cutouts 237A-237D that extend from the upper surface 233 partway toward the intermediate portion 204. In the embodiment illustrated, the cutouts 237A-237D extend through the groove 238 and terminate below the groove 238. Optionally, the cutouts 237A-237D may extend through the entire thickness of the sidewall 230 between the inwardly facing surface 235A and an outwardly facing surface 235B. However, in the embodiment illustrated, the cutouts 237A-237D extend from the inwardly facing surface 235A only partway toward the outwardly facing surface 235B of the sidewall 230. In such embodiments, the sidewall 230 may break or tear along one or more of the cutouts 237A-237D when the body 124 is inserted into the base 120 so that the one or more torn cutouts extend between the inwardly and outwardly facing surfaces 235A and 235B.

Referring to FIGS. 3A and 3B, the intermediate portion 204 includes a tapered sidewall 240 that defines a channel 242 that connects the lower opening 236 of the upper portion 202 with the upper opening 224 of the lower portion 200. The upper opening 224 of the lower portion 200 is smaller than the lower opening 236 of the upper portion 202. Thus, the channel 242 tapers toward the upper opening 224 of the lower portion 200.

In the embodiment illustrated, the outside threads 212 extend partway onto the intermediate portion 204. However, this is not a requirement. Referring to FIG. 4, an annular groove 248 extends circumferentially around the outside of the intermediate portion 204 above the outside threads 212. The annular groove 248 is configured to receive the seal 131 (e.g., an O-ring). When present, the seal 131 helps form a fluid tight seal with the pipe fitting 102 (see FIG. 1). However, optionally, the seal 131 may be omitted.

Figure 6:
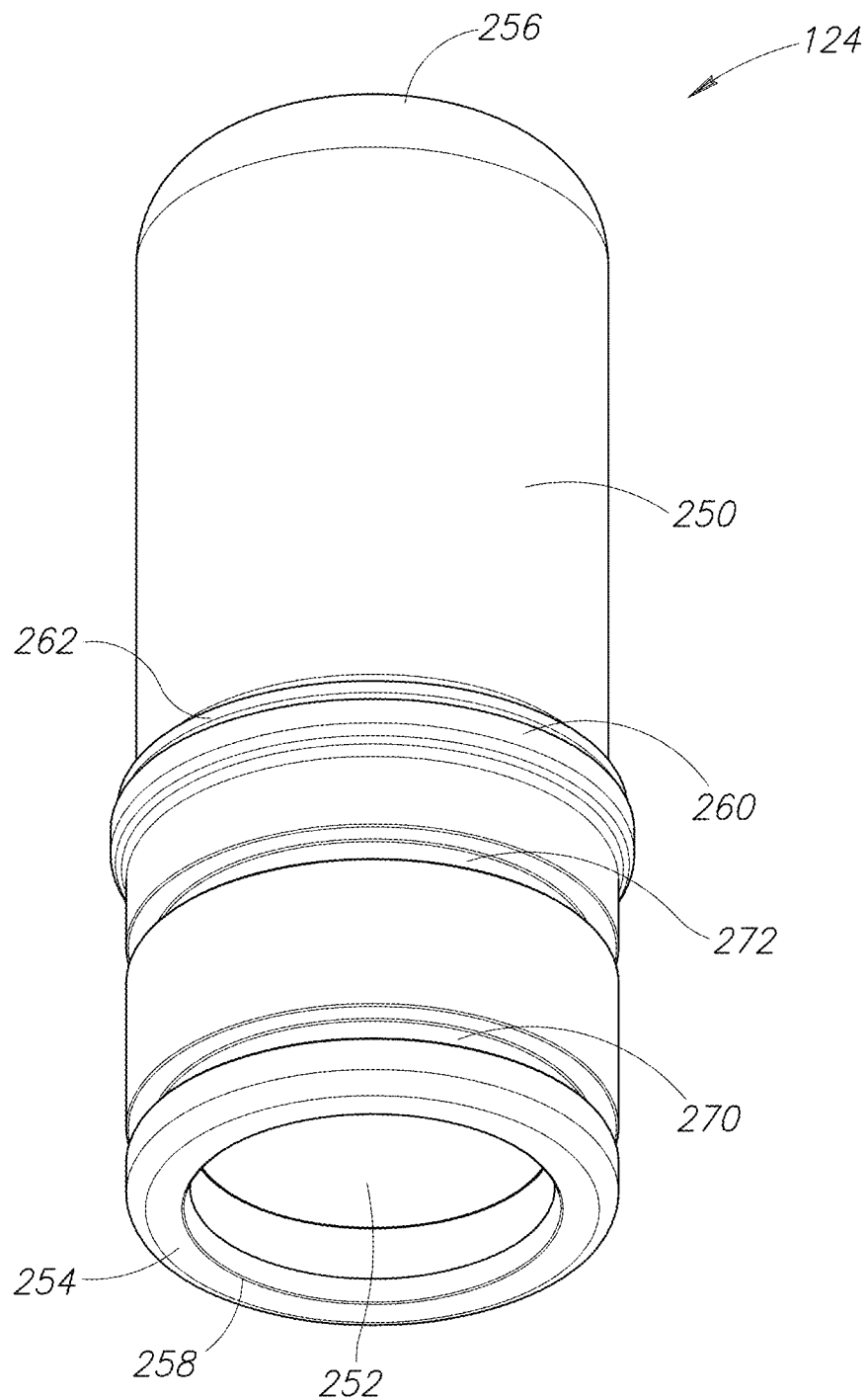
FIG. 6 is a bottom perspective view of a body of the arrestor of FIG. 1.

Referring to FIG. 6, the body 124 has a sidewall 250 defining a hollow interior 252. The sidewall 250 includes an open end 254 opposite a closed end 256. The open end 254 includes an opening 258 into the interior 252. Referring to FIG. 5, the open end 254 (see FIGS. 2, 6, and 11) is configured to be received by the upper opening 234 of the base 120 and be positioned against the lower opening 236 inside the chamber 232 of the base 120. Returning to FIG. 6, the hollow interior 252 includes the gas chamber 150 (see FIGS. 3A, 3B, 12, 14A and 14B), which is formed in part by the closed end 256. The hollow interior 252 is configured to receive the piston 126 (see FIGS. 2-3C, 7, 8, 10-12, 14A, and 14B) through the opening 258.

The sidewall 250 includes an outwardly extending locking ring or annular projection 260. An annular groove 262 extends around the outside surface of the projection 260. Referring to FIG. 3A, the projection 260 is configured to be received inside the groove 238 when the open end 254 (see FIGS. 2, 6, and 11) is received by the upper opening 234 (see FIGS. 5 and 16) of the base 120. The inwardly extending projection 239 is configured to be received inside the groove 262 and help maintain the projection 260 inside the groove 238. Thus, the base 120 and the body 124 snap together. Together, the projections 260 and 239 and the grooves 238 and 262 may be characterized as being a locking mechanism. The upper opening 234 (see FIGS. 5 and 16) may expand to allow the projection 260 to travel passed the inwardly extending projection 239 and into the groove 238. Thus, the upper opening 234 (see FIGS. 5 and 16) and the groove 238 may be characterized as being an expanding latch system.

Referring to FIG. 6, the sidewall 250 includes circumferentially extending annular grooves 270 and 272 configured to receive the seals 132 and 133 (see FIGS. 2-3B, 10, 14A, and 14B), respectively. The projection 260 (including the groove 262) and the grooves 270 and 272 may be molded into the exterior of the body 124. Referring to FIG. 3A, the seals 132 and 133 (e.g., O-rings) help form a fluid tight seal between the body 124 and the base 120.

Referring to FIG. 2, the ferrule 122 is generally ring shaped and may be implemented as a stainless steel reinforcement band or a stainless steel locking ring. The ferrule 122 is configured to be pressed (e.g., crimped) against the sidewall 250 of the body 124 and the upper portion 202 of the base 120 when the open end 254 of the body 124 is received inside the chamber 232 of the base 120 and the projection 260 is received inside the groove 238. Thus, the ferrule 122 may assume the outer shape of the components against which the ferrule 122 is pressed. The ferrule 122 permanently attaches the body 124 to the base 120 and prevents the body 124 and the base 120 from moving with respect to one another.

Figure 7:
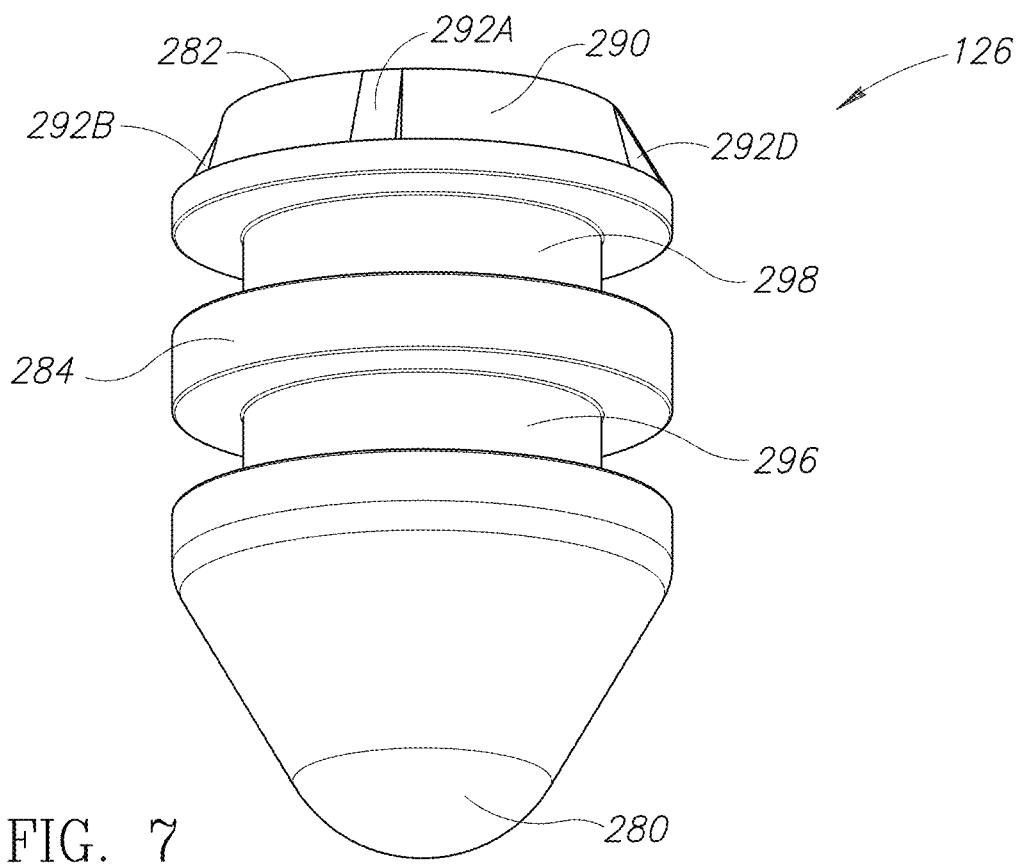
FIG. 7 is a side perspective view of the piston of the arrestor of FIG. 1.

Referring to FIG. 7, the piston 126 has a tapered lower end portion 280 opposite an upper end portion 282. A side portion 284 extends between the tapered lower end portion 280 and the upper end portion 282. The tapered lower end portion 280 has an outer shape that corresponds to the tapered sidewall 240 (see FIGS. 3A, 3B, 5, 10, and 12). Thus, as shown in FIG. 3A, the tapered lower end portion 280 (see FIGS. 3C, 7, 10, 12, and 14A) may abut the tapered sidewall 240.

Figure 8:
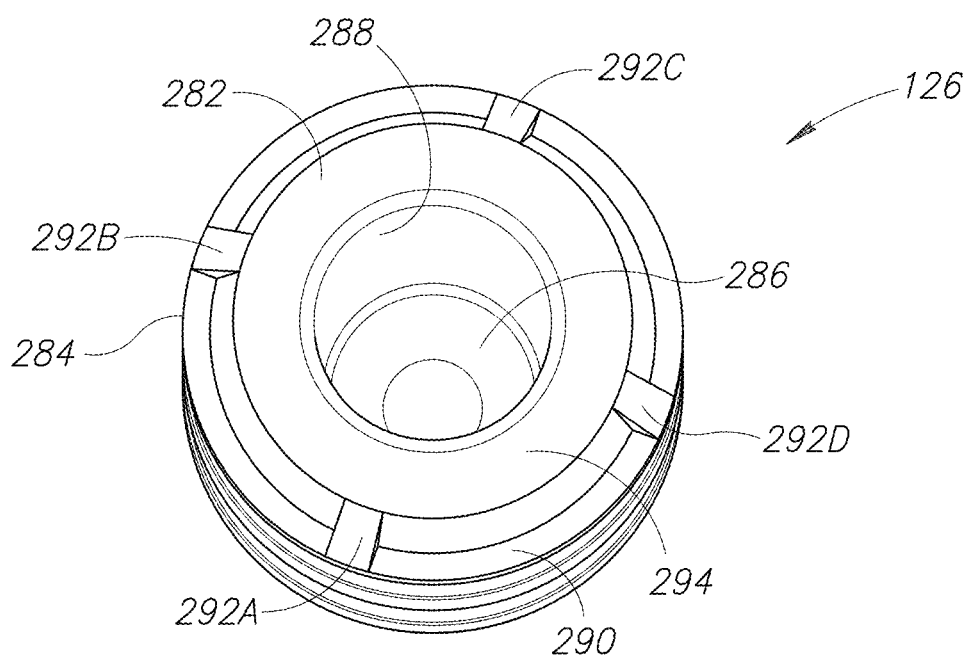
FIG. 8 is a top perspective view of the piston of the arrestor of FIG. 1.

Referring to FIG. 8, the piston 126 includes a channel 286 that extends from an opening 288 formed in the upper end portion 282 toward the tapered lower end portion 280 (see FIGS. 3C, 7, 10, 12, and 14A). However, the channel 286 is closed inside the piston 126. The upper end portion 282 includes an outer circumferentially extending annular recess 290. Optionally, the recess 290 may include outwardly extending projections 292A-292D. In the embodiment illustrated, the projections 292A-292D extend from the side portion 284 to at or near an upper surface 294 of the upper end portion 282.

Referring to FIG. 7, the side portion 284 includes circumferentially extending annular grooves 296 and 298 configured to receive the seals 134 and 135 (see FIGS. 2-3C, 10, 14A and 14B), respectively. Referring to FIG. 3A, the seals 134 and 135 (e.g., O-rings) help form a fluid tight seal between the piston 126 and the body 124.

Method

Figure 9:
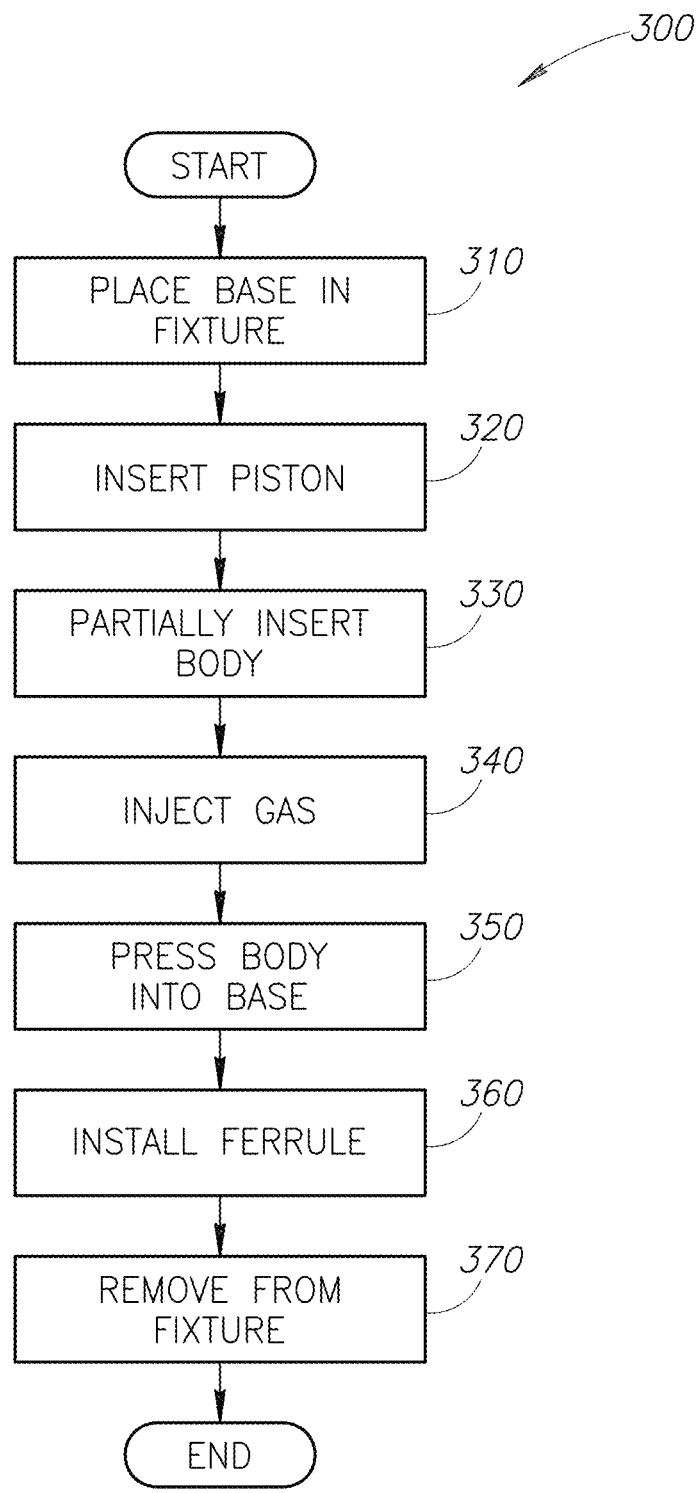
FIG. 9 is a flow diagram of a method of constructing the arrestor of FIG. 1.
Figure 10:
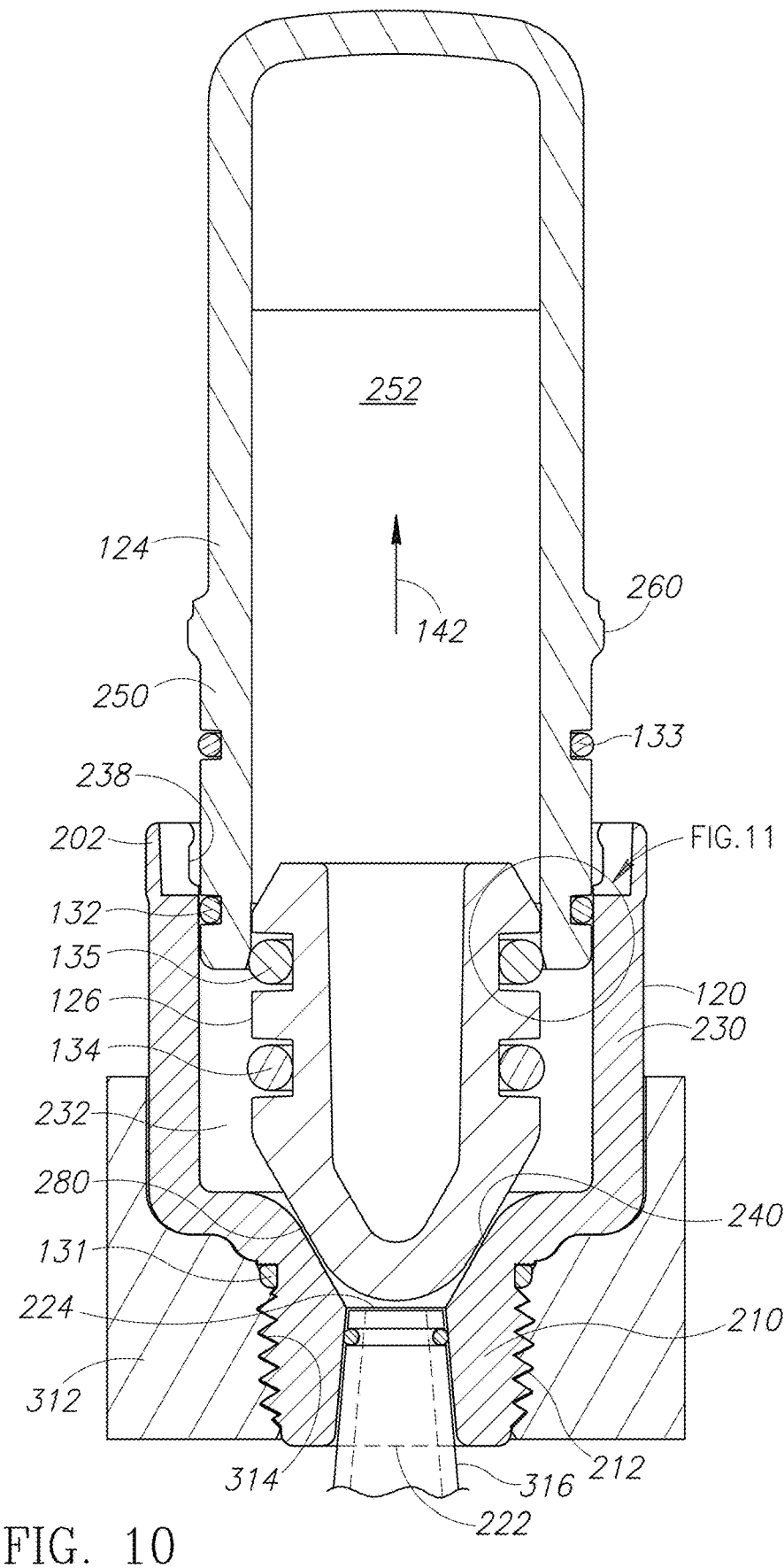
FIG. 10 is a cross-sectional side view of the base of the arrestor of FIG. 1 mounted in a fixture with gas being injected into the body before the body is fully inserted into the base.

FIG. 9 is a flow diagram of a method 300 of constructing the arrestor 100. Referring to FIG. 10, in first block 310 (see FIG. 9), the base 120 is mounted in a fixture 312. Before the base 120 is mounted in the fixture 312, optionally, the seal 131 may be positioned in the groove 248 (see FIG. 4) of the base 120. In the embodiment illustrated, the fixture 312 includes inside threads 314 configured to receive the outside threads 212. Thus, threaded engagement between the threads 212 and 314 maintains the connector portion 210 of the base 120 inside the fixture 312. A fluid tight seal is formed between the fixture 312 and the connector portion 210. A nipple or nozzle 316 is inserted into the through-channel 220 through the lower opening 222. The nozzle 316 is configured to inject the gas (e.g., nitrogen) into the through-channel 220 and/or the upper opening 224 of the base 120.

Next in block 320 (see FIG. 9), the piston 126 is inserted into the chamber 232 of the base 120 with the tapered lower end portion 280 resting on the tapered sidewall 240 of the base 120. Before the piston 126 is inserted into the chamber 232, the seals 134 and 135 are positioned inside the annular grooves 296 and 298 (see FIG. 7).

In block 330 (see FIG. 9), the body 124 is partially inserted into the chamber 232 of the base 120. The body 124 is inserted far enough that the sidewall 250 of the body 124 presses against the sidewall 230 of the base 120 and forms a gas tight seal therewith. In the embodiment illustrated, the seal 132 forms a gas tight seal between the body 124 and the base 120.

Figure 11:
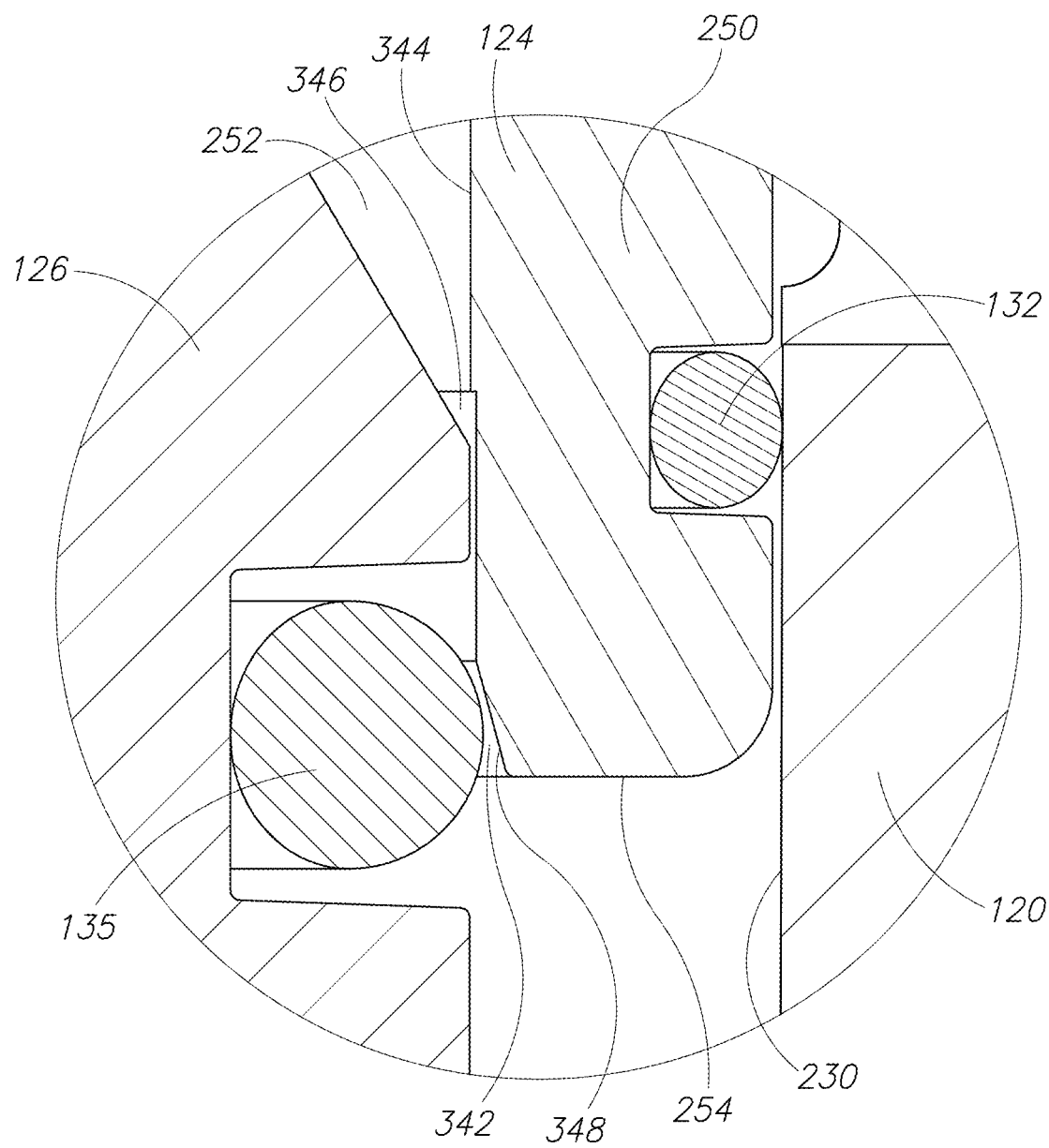
FIG. 11 is an enlarged portion of FIG. 10.

Returning to FIG. 10, in block 340 (see FIG. 9), the gas (e.g., nitrogen) is injected through the nozzle 316 into the lower opening 222 of the base 120 with sufficient pressure to push the piston 126 upwardly and away from the tapered sidewall 240 of the base 120 as shown in FIG. 10. As shown in FIG. 11, when in this configuration, a gap 342 is defined between the piston 126 and the body 124. The gas passes upwardly through the gap 342 (see FIG. 11) and into the interior 252 of the body 124. Gravity holds the piston 126 in place as the gas travels past the piston 126, through the gap 342, and into the body 124. The pressure and volume of the injected gas is controlled to prevent the piston 126 from traveling upwardly into the interior 252 of the body 124 and blocking flow of the gas into the interior 252 of the body 124.

A recess 346 may be formed in an inside surface 344 of the sidewall 250 along the open end 254. In the embodiment illustrated, the recess 346 includes an angled or chamfered lowermost portion 348. The recess 346 is configured to ensure the gap 342 is sufficiently large to allow the gas (e.g., nitrogen) to pass therethrough into the interior 252 of the body 124. In the embodiment illustrated, the seal 135 is positioned at least partially within the recess 346. The recess 346 spaces the sidewall 250 of the body 124 away from the seal 135 and prevents the seal 135 from engaging the sidewall 250 of the body 124. Thus, at least a portion of the gap 342 may be positioned inside the recess 246.

The seal between the body 124 and the base 120 (e.g., formed by the seal 132) prevents the gas from escaping as the gas is injected through the lower opening 222. In this way, the arrestor 100 (see FIGS. 1-3B and 13-14B) is charged with the gas. The seal 132 keeps the gas (e.g., nitrogen) from escaping until pressure is equalized. The pressure is equalized when the pressure inside the interior 252 of the body 124 is equal to the pressure of the gas entering the lower opening 222 (see FIGS. 3A-4 and 10) of the base 120. When this occurs, the tapered lower end portion 280 returns to the resting position on the tapered sidewall 240 of the base 120 illustrated in FIG. 3A. Referring to FIG. 10, in this position, the piston 126 seals the gas inside the base 120 and the body 124. At this point, the body 124 is pressurized.

Figure 12:
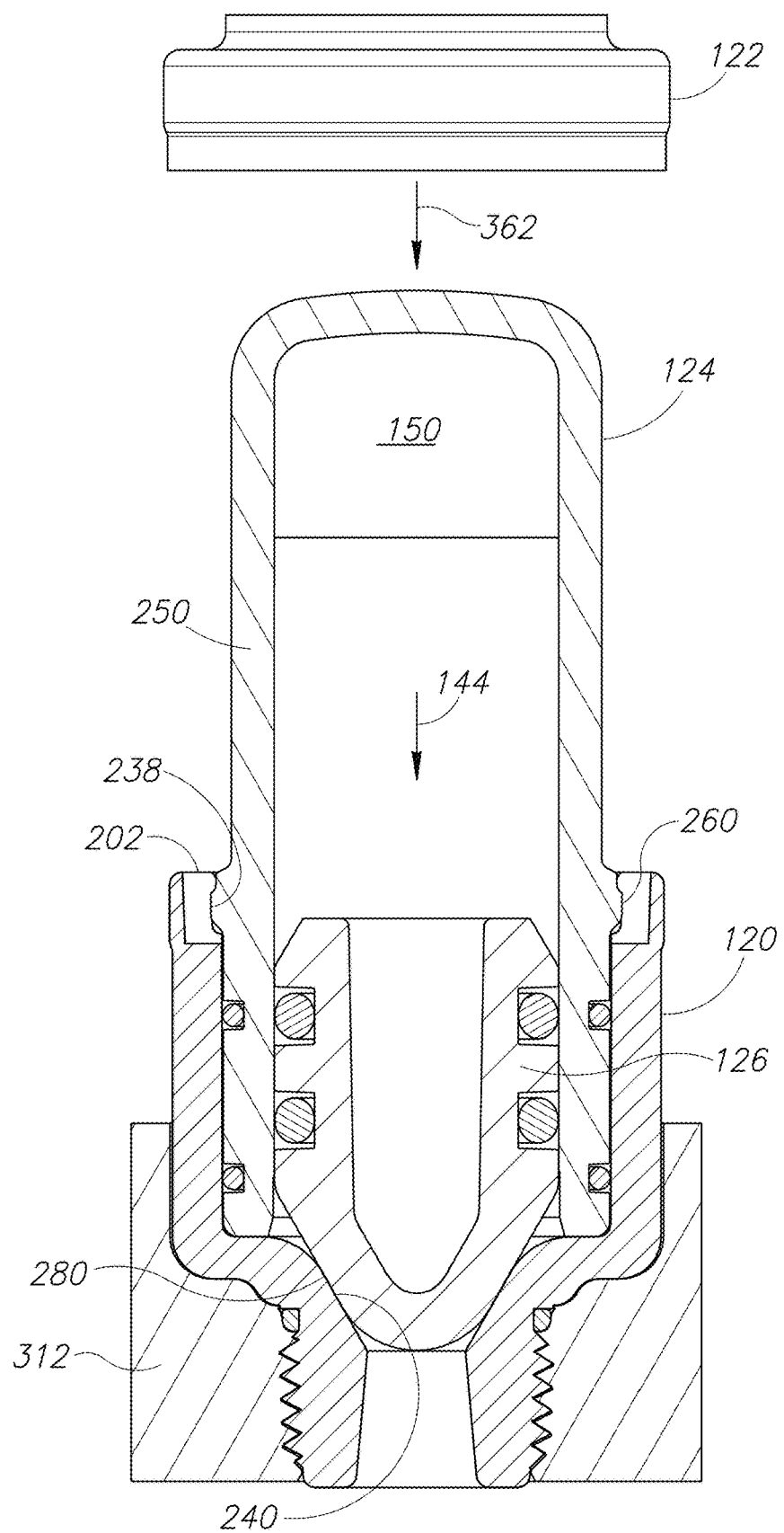
FIG. 12 is a cross-sectional side view of the base of the arrestor of FIG. 1 illustrated after the body has been fully inserted into the base and before a ferrule has been installed.

Referring to FIG. 12, in block 350 (see FIG. 9), the body 124 is pressed into the chamber 232 of the base 120 until the projection 260 is received inside the groove 238 and the projection 239 is received inside the groove 262 (or the locking mechanism engages), which locks the body 124 and the base 120 together. This installs the piston 126 in place, and holds the base 120 and the body 124 together so that the ferrule 122 may be installed. Referring to FIG. 11, pressing the body 124 into the base 120 also pushes the recess 346 beyond the seal 135 allowing the seal 135 to engage the sidewall 250 of the body 124. In other words, pressing the body 124 into the base 120 eliminates the gap 342 so that the gas can no longer flow between the piston 126 and the body 124. Thus, referring to FIG. 12, at this point, the gas is trapped inside the gas chamber 150. Further, the base 120 reinforces nearly half the length of the body 124, which reduces creep potential (or expansion of the open end 254) caused by internal pressure inside the gas chamber 150. Additionally, the projection 260 and/or the ferrule 122 may also help prevent the open end 254 from being stretched or expanded by the internal pressure inside the gas chamber 150.

Referring to FIG. 10, pressing the body 124 into the base 120 also pushes the seal 133 into engagement with the sidewall 230 of the base 120 and the seal 134 into engagement with the sidewall 250 of the body 124. Thus, a lower portion of the sidewall 250 of the body 124 is sandwiched between the piston 126 and the sidewall 230 of the base 120. As the body 124 is pressed into the chamber 232 of the base 120, any gas inside the chamber 232 may be compressed and push the piston 126 upwardly and away from the tapered sidewall 240 of the base 120. Thus, the gas inside the chamber 232 may exit therefrom between the tapered lower end portion 280 of the piston 126 and the tapered sidewall 240 (e.g., after the nozzle 316 has been moved from the through-channel 220).

Referring to FIG. 12, in block 360 (see FIG. 9), the ferrule 122 is installed by sliding the ferrule 122 over the body 124 (along a direction identified by an arrow 362) and pressing (e.g., crimping) the ferrule 122 against both the sidewall 250 and the upper portion 202 of the base 120.

Next, in block 370 (see FIG. 9), the base 120 is removed (e.g., unthreaded) from the fixture 312. Then, the method 300 (see FIG. 9) terminates.

Alternate Embodiment

Figure 13:
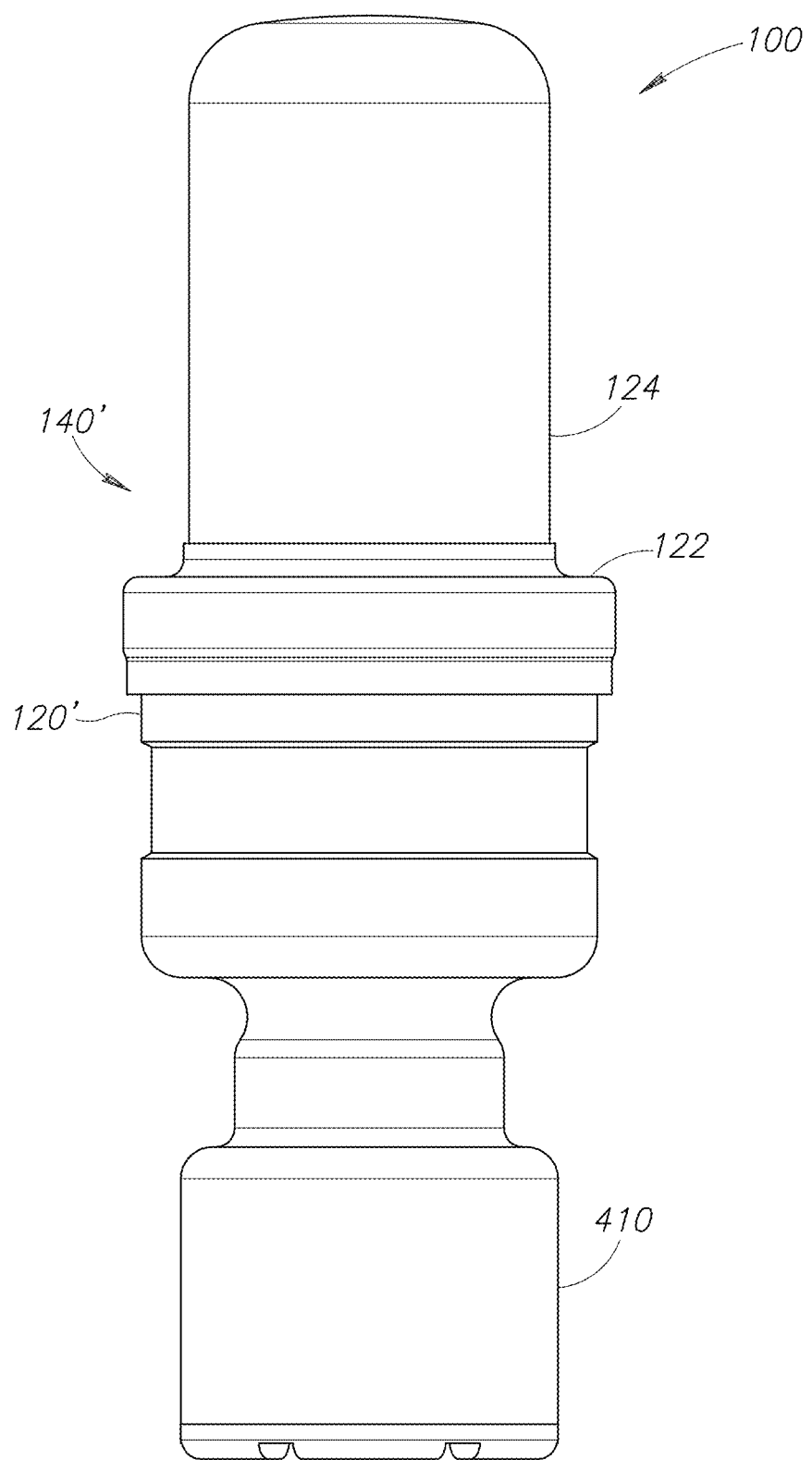
FIG. 13 is a side elevational view of an alternate embodiment of the arrestor of FIG. 1 constructed with a second embodiment of the base.
Figure 14A:
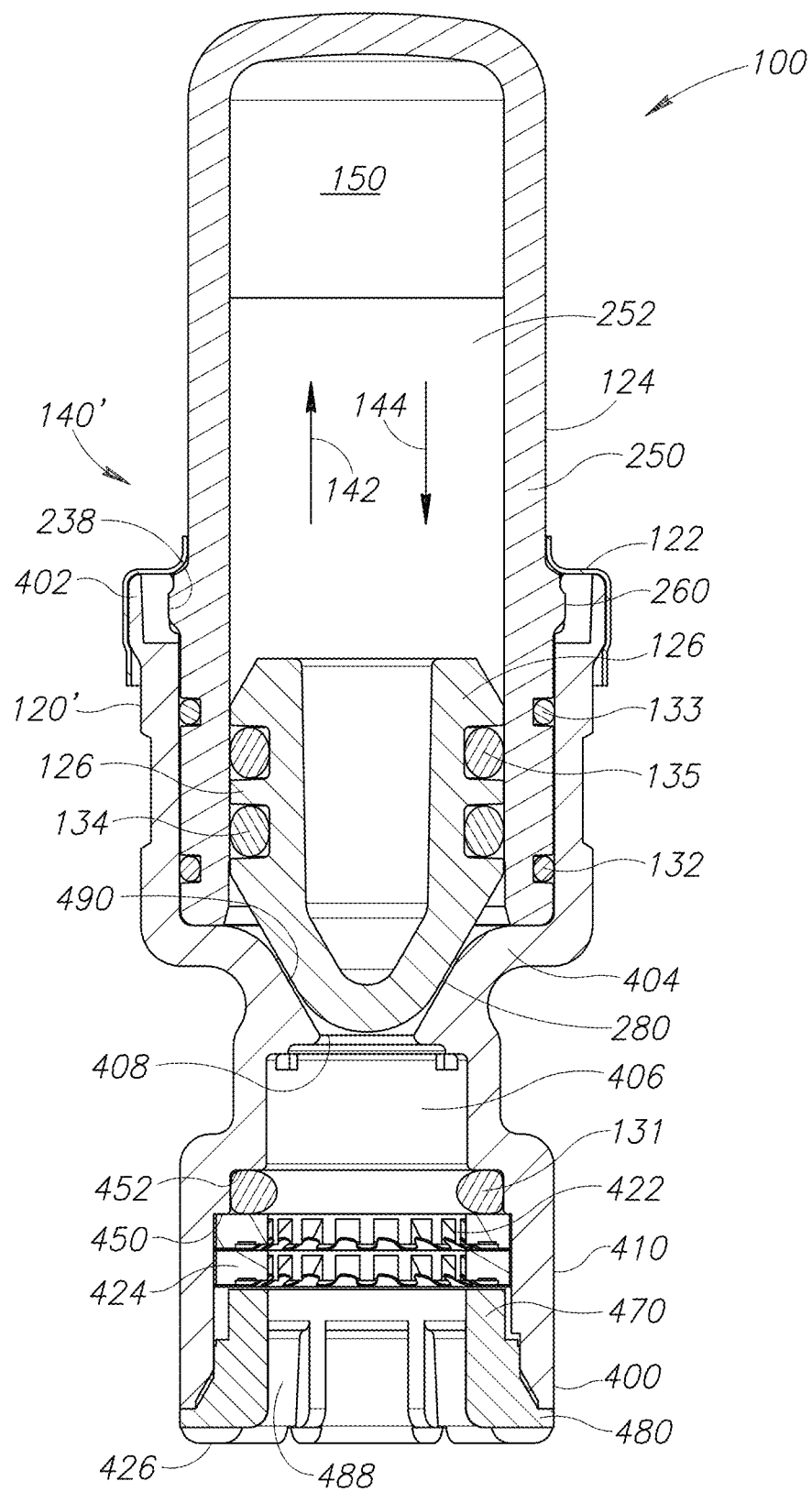
FIG. 14A is a cross-sectional side view of the arrestor of FIG. 13 illustrated with its piston in the resting position.
Figure 14B:
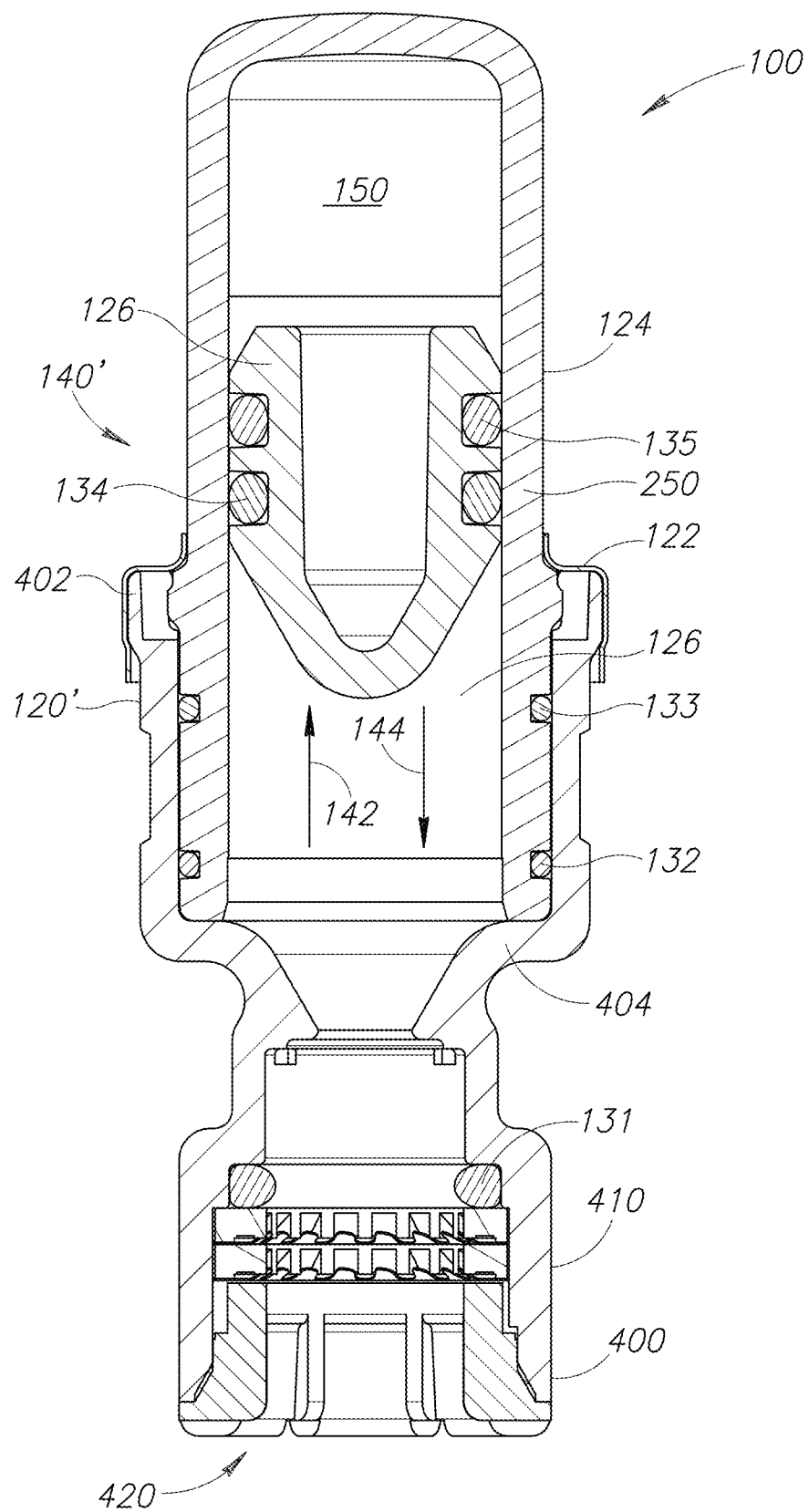
FIG. 14B is a cross-sectional side view of the arrestor of FIG. 13 illustrated with the piston moved along the compression direction to absorb at least a portion of the force of a water hammer traveling in the pipe system.

FIGS. 13-14B illustrate an alternate embodiment of the arrestor 100 constructed with a second embodiment of a base 120' that has been used instead and in place of the base 120 (see FIGS. 1-5 and 10-12). Like the base 120, the base 120' may be constructed (e.g., molded, cast, forged, machined, and the like) from any suitable material, including plastic (e.g., CPVC) and/or metal. As shown in FIGS. 13-14B, together, the base 120' and the body 124 form a housing 140' that is locked together by the ferrule 122 and is substantially similar to the housing 140 (see FIGS. 1, 3A, and 3B).

Figure 15:
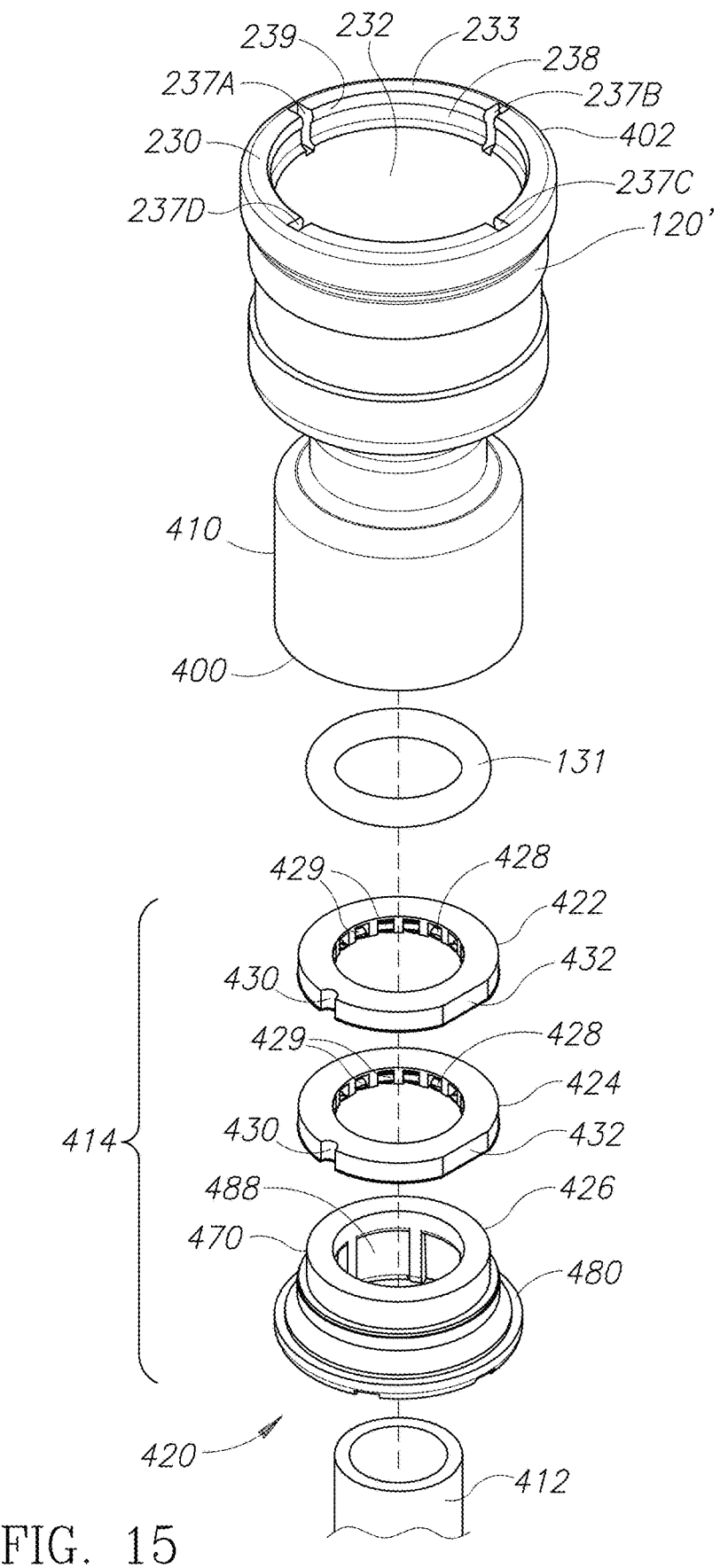
FIG. 15 is an exploded perspective view showing components of a push-to-fit coupler of the arrestor of FIG. 13.
Figure 16:
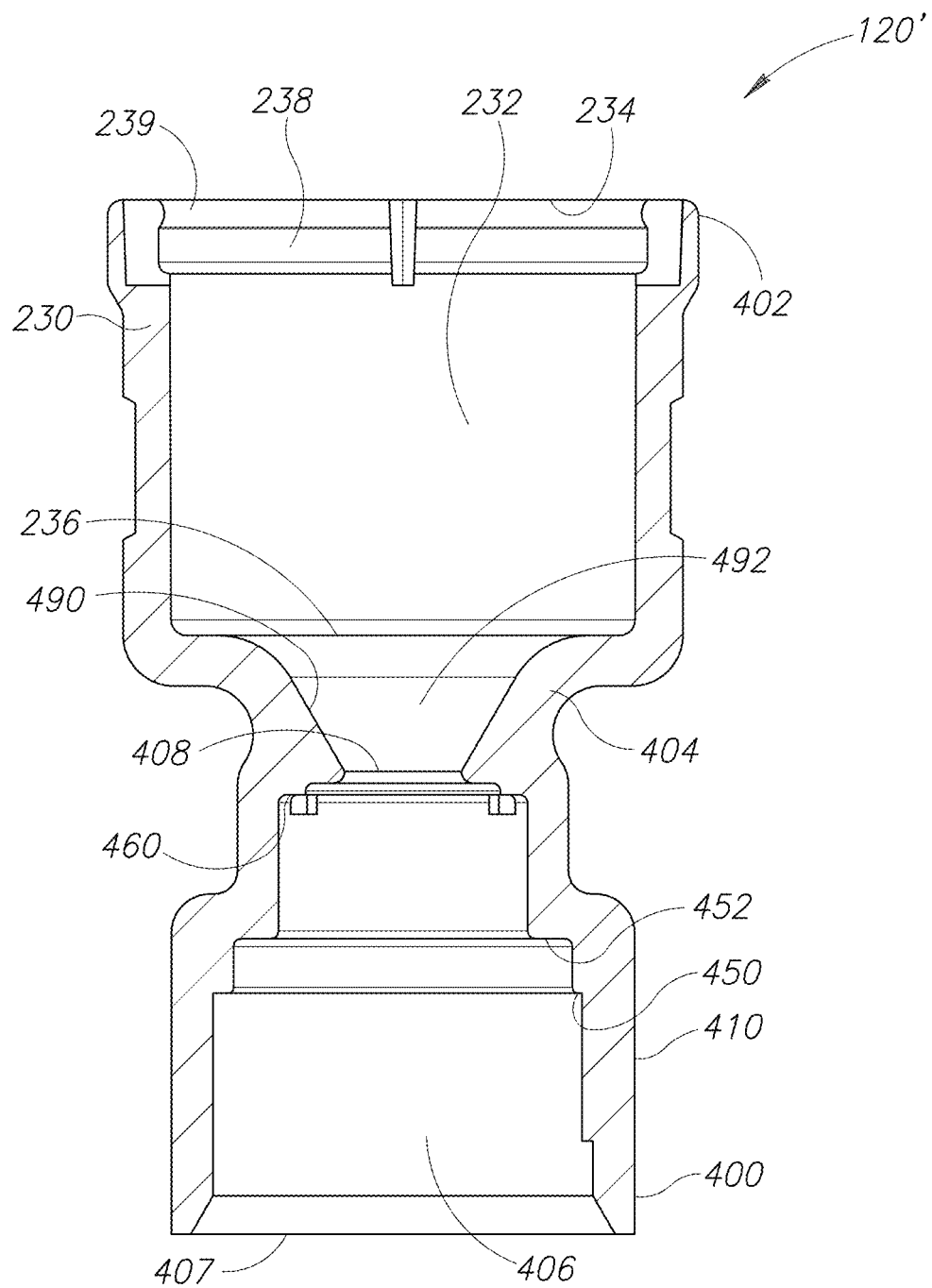
FIG. 16 is a cross-sectional side view of the second embodiment of the base.

Referring to FIG. 15, the base 120' has a lower portion 400 opposite an upper portion 402. The base 120 also includes an intermediate portion 404 (see FIGS. 14A, 14B, and 16) positioned between the lower and upper portions 400 and 402. Referring to FIG. 16, the lower portion 400 has a through-channel 406 that extends between lower and upper openings 407 and 408.

Referring to FIG. 15, the lower portion 400 has a connector portion 410 configured to be coupled to a free end of a tube or pipe 412 of the pipe assembly 101 (see FIG. 1) and to form a connection therewith. The pipe 412 may include one of the pipe(s) 104 (see FIG. 1) or a pipe connected to the pipe(s) 104. In the embodiment illustrated, together, the connector portion 410, the seal 131, and ring-shaped internal connector components 414 form a push-to-fit coupler 420. By way of a non-limiting example, the push-to-fit coupler 420 may be implemented using any of the fluid couplings disclosed in U.S. Pat. No. 6,464,266, filed on May 12, 2000, and titled Tube Coupling, which is incorporated herein by reference in its entirety.

Figure 17:
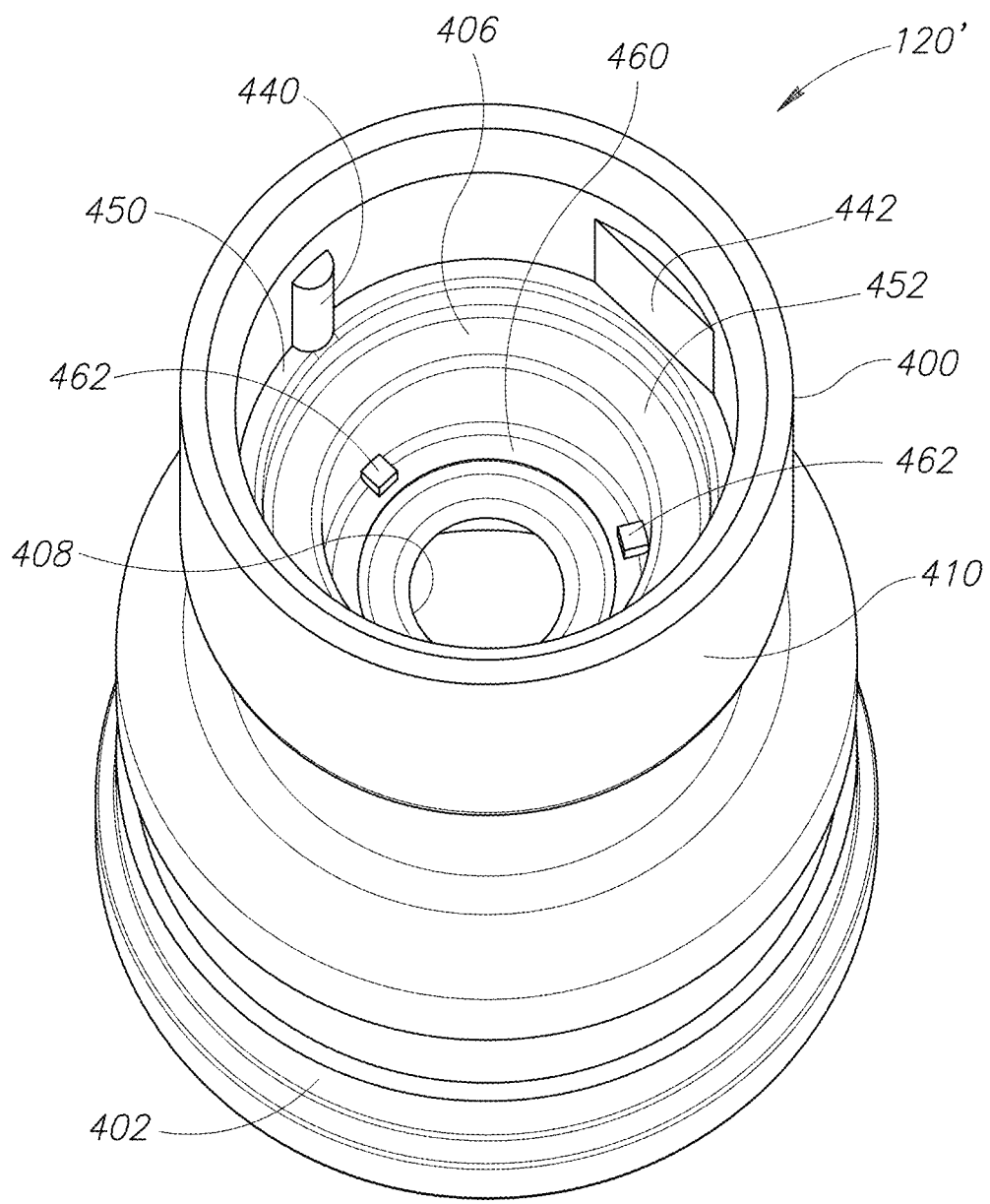
FIG. 17 is a bottom perspective view of the second embodiment of the base.

In the embodiment illustrated, the connector portion 410 houses the seal 131 and the connector components 414 inside the through-channel 406 (see FIGS. 14A, 16, and 17). The connector components 414 include a first gripper ring 422, a second gripper ring 424, and an end bushing 426. The first and second gripper rings 416 and 418 are substantially identical to one another. Each of the first and second gripper rings 422 and 424 includes a central through-hole 428 configured to allow the pipe 412 to pass therethrough. Each of the first and second gripper rings 422 and 424 includes a plurality of fingers 429 that extend into the through-hole 428. The fingers 429 of the first and second gripper rings 422 and 424 are configured to grip the pipe 412 when the pipe 412 is positioned inside the through-holes 428. Each of the first and second gripper rings 422 and 424 may include one or more keyways 430 and 432 positioned along their outer circumferences.

Referring to FIG. 17, the connector portion 410 may include one or more keys 440 and 442 that extend inwardly into the through-channel 406. The keys 440 and 442 are configured to be received by the keyways 430 and 432 (see FIG. 15), respectively, and prevent the first and second gripper rings 422 and 424 (see FIGS. 13A and 15) from rotating inside the through-channel 406.

The connector portion 410 may include first, second, and third shoulders 450, 452, and 460 formed along the through-channel 406. Referring to FIG. 13A, the first gripper ring 422 may abut the first shoulder 450, which is configured to prevent the first gripper ring 422 from traveling deeper into the through-channel 406 toward the upper opening 408. The seal 131 may abut the second shoulder 452, which is configured to prevent the seal 131 from traveling deeper into the through-channel 406 toward the upper opening 408. Thus, the seal 131 is sandwiched between the second shoulder 452 and the first gripper ring 422. Referring to FIG. 17, the third should 460 is positioned near the upper opening 408 and is configured to limit or stop the travel of the pipe 412 (see FIG. 15) into the through-channel 406. In the embodiment illustrated, one or more spacer projections 462 extend downwardly from the third should 460. The pipe 412 (see FIG. 15) may abut the spacer projection(s) 462 when the pipe 412 is fully inserted into the through-channel 406.

Referring to FIG. 14A, the end bushing 426 has an upper portion 470 configured to be positioned inside the through-channel 406 within the connector portion 410 of the base 120'. Opposite the upper portion 470, the end bushing 426 has a lower portion 480 that extends outwardly beyond the connector portion 410 and abuts the lower portion 400 of the base 120'. The end bushing 426 may be press fit inside the connector portion 410. The end bushing 426 is positioned immediately adjacent the second gripper ring 424 and helps retain the first and second gripper rings 422 and 424 and the seal 131 inside the through-channel 406 within the connector portion 410. Referring to FIG. 15, the end bushing 426 includes a central through-channel 488 configured to allow the pipe 412 to pass therethrough into the through-holes 428 of the first and second gripper rings 422 and 424 and into engagement with the third shoulder 460 (see FIG. 17).

Referring to FIG. 16, the upper portion 402 is substantially identical to the upper portion 202 (see FIGS. 2-5, 10 and 12). Thus, the upper portion 402 includes the sidewall 230 that defines the chamber 232 having the upper and lower openings 234 and 236. The upper opening 234 is configured to receive the body 124 (see FIGS. 1-3C, 6, and 10-14B) into the chamber 232. Further, the sidewall 230 includes the groove 238 formed along the upper opening 234 and the inwardly extending projection 239 positioned above the groove 238. Referring to FIG. 15, optionally, the upper portion 402 may include the downwardly extending cutouts 237A-237D (described above) that extend from the upper surface 233 of the upper portion 402 partway toward the intermediate portion 404 (see FIGS. 14A, 14B, and 16).

Referring to FIG. 16, the intermediate portion 404 includes a tapered sidewall 490 that is substantially identical to the tapered sidewall 240 (see FIGS. 3A, 3B, 5, 10, and 12) and defines a channel 492 (see FIG. 3) that connects the lower opening 236 of the upper portion 402 with the upper opening 408 of the lower portion 400 (see FIG. 14A-17). The upper opening 408 of the lower portion 400 (see FIG. 14A-17) is smaller than the lower opening 236 of the upper portion 402. Thus, like the channel 242 (see FIGS. 3A, 3B, and 5), the channel 492 tapers toward the upper opening 408 of the lower portion 400. Also, referring to FIG. 14A, like the tapered sidewall 240 (see FIGS. 3A, 3B, 5, 10, and 12), the shape of the tapered sidewall 490 corresponds to the outer shape of the tapered lower end portion 280 (see FIGS. 3C, 7, 10, 12, and 14A) of the piston 126. Thus, as shown in FIG. 14A, the tapered lower end portion 280 may abut the tapered sidewall 490 and form a fluid tight seal therewith.

As shown in FIG. 14B, the gas is compressed when the piston 126 moves in the compression direction (identified by the arrow 142). Conversely, referring to FIG. 14A, the gas decompresses when the piston 126 moves in the decompression direction (identified by the arrow 144). The tapered lower end portion 280 of the piston 126 rests on the tapered sidewall 490 of the base 120' until a pressure wave in the pipe assembly 101 (see FIG. 1) causes the piston 126 to move (as shown in FIG. 14B) toward the compression direction (identified by the arrow 142). This causes the gas to absorb at least some of the energy of the pressure wave thereby reducing and/or eliminate the water hammer. When the pressure wave has dissipated, the piston 126 moves in the decompression direction (identified by the arrow 144) and returns to its resting position on the base 120' illustrated in FIG. 14A.

Referring to FIG. 15, the method 300 (see FIG. 9) may be performed to construct the arrestor 100 with the base 120'. In first block 310 (see FIG. 9), the base 120' (with the seal 131 and the connector components 414 installed therein to form the push-to-fit coupler 420) is mounted in a fixture (not shown). The nozzle 316 (see FIG. 10) is received by the push-to-fit coupler 420.

Then, referring to FIG. 14A, in block 320 (see FIG. 9), the piston 126 (with the seals 134 and 135 are positioned inside the annular grooves 296 and 298 illustrated in FIG. 7) is inserted into the chamber 232 (see FIGS. 15 and 16) of the base 120' with the tapered lower end portion 280 resting on the tapered sidewall 490.

Next, referring to FIG. 10, in block 330 (see FIG. 9), the body 124 is partially inserted into the chamber 232 of the base 120' (see FIGS. 13-17) with the seal 132 forming a fluid tight seal between the body 124 and the base 120'.

Referring to FIG. 14A, in block 340 (see FIG. 9), the nozzle 316 (see FIG. 10) injects the gas (e.g., nitrogen) into the upper opening 408 of the base 120' with sufficient pressure to push the piston 126 upwardly and away from the tapered sidewall 490. Referring to FIG. 11, the gas passes upwardly through the gap 342 and into the interior 252 of the body 124 until the body 124 is pressurized.

Referring to FIG. 14A, in block 350 (see FIG. 9), the body 124 is pressed into the chamber 232 (see FIGS. 15 and 16) of the base 120' until the projection 260 is received inside the groove 238 (or the locking mechanism engages), which locks the body 124 and the base 120' together.

In block 360 (see FIG. 9), the ferrule 122 is installed by sliding the ferrule 122 over the body 124 (along the direction identified by the arrow 362 in FIG. 12) and pressing (e.g., crimping) the ferrule 122 against both the sidewall 250 and the upper portion 402 of the base 120'.

Next, in block 370 (see FIG. 9), the base 120' is removed from the fixture (not shown). Then, the method 300 (see FIG. 9) terminates.

The ferrule 122 reinforces the housing 140 or 140' and handles load applied by the gas inside the gas chamber 150, which leaves the arrestor 100 to deal with only the normal forces that the pipe assembly 101 (see FIG. 1) must endure. Thus, the arrestor 100 may be characterized as being a hybrid type pressure vessel unlike other arrestors available in the industry.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A device for arresting a shock wave in a fluid in an assembly, the device comprising:

a base having a connector portion with a first opening into an interior, the base having a second opening into the interior, the connector portion being configured to be coupled to the assembly and to allow the fluid to flow into the interior through the first opening when the connector portion is coupled to the assembly, the base comprising an inwardly extending projection adjacent to a base groove;

a body having an open end opposite a closed end and a channel that extends from the open end into the closed end, the open end being positioned inside the second opening of the base and forming a housing therewith, the body comprising an outwardly extending annular projection positioned between the open and closed ends, the outwardly extending annular projection having an annular body groove formed therein, the outwardly extending annular projection being positioned inside the base groove, inwardly extending projection being positioned inside the annular body groove, together the outwardly extending annular projection, the annular body groove, the inwardly extending projection, and the base groove forming a locking mechanism that helps prevent movement of the body away from the base;

a ferrule disposed circumferentially around a first portion of the base and a second portion the body, the ferrule locking the first and second portions together; and a piston positioned inside the housing, the piston being slidable inside the housing from a resting position to a compressing position when the shock wave travels through the assembly, the piston compressing a gas inside the housing when the piston is in the compressing position.

2. The device of claim 1 for use with the assembly comprising a fitting with first threads, wherein the connector portion comprises second threads configured to engage the first threads and thereby couple the base to the assembly.

3. The device of claim 1 for use with the assembly comprising a pipe having a free end, the device further comprising:

a push-to-fit coupler configured to receive the free end of the pipe into the first opening and form a connection therewith, the push-to-fit coupler comprising the connector portion, the fluid flowing into the interior through the first opening when the free end of the pipe is received inside the first opening.

4. The device of claim 1, further comprising:
a seal configured to be positioned between the connector portion and the assembly.

5. The device of claim 1, further comprising:
a first seal configured to be positioned between the body and the base.

6. The device of claim 5, further comprising:
a second seal spaced apart from the first seal and configured to be positioned between the body and the base.

7. The device of claim 1, further comprising:
a seal configured to be positioned between the piston and the base.

8. The device of claim 1, wherein the compressing position is above the resting position such that gravity returns the piston to the resting position after the shock wave has traveled through the assembly passed the device.

9. The device of claim 1, wherein the piston comprises a tapered lower end portion,
the base comprises a tapered sidewall, and
the tapered lower end portion rests on the tapered sidewall when the piston is in the resting position.

10. The device of claim 1, wherein the body comprises a recess formed in the open end,
the recess is configured to define at least a portion of a gap between the piston and the body when the open end is in a first position inside the second opening of the base,
the first opening of the base is configured to receive the gas,
the gap allows the gas to travel therethrough and into a gas chamber defined between the piston and the closed end of the body,
the open end of the body is configured to be pressed into the second opening of the base from the first position to a second position,
the outwardly extending annular projection is positioned inside the base groove when the open end of the body is in the second position,
the inwardly extending projection is positioned inside the annular body groove when the open end of the body is in the second position, and
the gap is eliminated and the gas is trapped inside the gas chamber when the open end of the body is in the second position.

11. The device of claim 10, wherein the body comprises a first seal configured to form a first fluid tight seal between the body and the base when the open end of the body is in the first position.

12. The device of claim 11, wherein the piston comprises a second seal configured to be at least partially positioned inside the recess when the open end of the body is in the first position,
the recess is configured to prevent the second seal from forming a second fluid tight seal with the body when the open end of the body is in the first position, and
a portion of the gap is defined between the second seal and the recess when the open end of the body is in the first position.

13. The device of claim 12, wherein the recess is configured to be pushed passed the second seal when the open end of the body is pressed from the first position to the second position, and
the second seal is configured to engage the body thereby forming the second fluid tight seal between the body and the piston when the open end of the body is in the second position.

14. The device of claim 13, wherein the body comprises a third seal configured to be positioned outside the second opening of the base when the open end of the body is in the first position, and
the third seal is configured to be pushed through the second opening and into engagement with the base thereby forming a third fluid tight seal between the body and the base when the open end of the body is pressed from the first position to the second position.

15. The device of claim 10, wherein the piston is configured to allow gravity to hold the piston in place as the gas travels past the piston, through the gap, and into the gas chamber.

* * * * *